(12) United States Patent
Gepner et al.

(10) Patent No.: US 8,373,679 B2
(45) Date of Patent: Feb. 12, 2013

(54) INFRARED TOUCHSCREEN ELECTRONICS

(75) Inventors: Joseph E. Gepner, Overland Park, KS (US); David M. Dixon, Overland Park, KS (US); Joseph L. Komer, Lenexa, KS (US)

(73) Assignee: Garmin International, Inc., Olathe, KS (US)

( * ) Notice: Subject to any disclaimer, the term of this patent is extended or adjusted under 35 U.S.C. 154(b) by 319 days.

(21) Appl. No.: 12/787,194

(22) Filed: May 25, 2010

(65) Prior Publication Data

US 2011/0084939 A1    Apr. 14, 2011

Related U.S. Application Data

(60) Provisional application No. 61/250,705, filed on Oct. 12, 2009.

(51) Int. Cl.
*G06F 3/042* (2006.01)
(52) U.S. Cl. ...................................... 345/175; 178/18.09
(58) Field of Classification Search .......... 345/173–184; 178/18.01–19.02; 340/407.1–407.2; 250/336.1–395; 353/42; 341/22–31
See application file for complete search history.

(56) References Cited

U.S. PATENT DOCUMENTS

| | | | | |
|---|---|---|---|---|
| 4,812,642 A | * | 3/1989 | Hasegawa et al. | 250/221 |
| 4,855,590 A | | 8/1989 | Bures et al. | 250/221 |
| 6,429,857 B1 | | 8/2002 | Masters et al. | 345/175 |
| 6,677,934 B1 | | 1/2004 | Blanchard | 345/175 |
| 2002/0075243 A1 | * | 6/2002 | Newton | 345/173 |
| 2003/0006973 A1 | * | 1/2003 | Omura et al. | 345/175 |
| 2004/0251402 A1 | * | 12/2004 | Reime | 250/221 |

* cited by examiner

*Primary Examiner* — Liliana Cerullo
(74) *Attorney, Agent, or Firm* — Samuel M. Korte; Mohammad M. Ali (57) ABSTRACT

Touchscreen electronics for detecting touches on a display screen broadly comprises a plurality of transmitters, a plurality of receivers, and a controller. Each transmitter may transmit at least one beam across the display screen, wherein the beam may be switched on and off in a repeated pattern. The receivers may detect the beams from the transmitters, and each receiver may generate an "on" value that corresponds to the beam being switched on and an "off" value that corresponds to the beam being switched off. The controller communicates with the transmitters and the receivers and may be configured to determine that a touch has occurred when the "on" value generated by one of the receivers transitions in a sequence from greater than an upper level to less than a lower level.

20 Claims, 8 Drawing Sheets

PRIOR ART

INFRARED TOUCHSCREEN ELECTRONICS

CROSS-REFERENCE TO RELATED APPLICATIONS

The present application claims the benefit under 35 U.S.C. §119(e) of U.S. Provisional Application Ser. No. 61/250,705, filed Oct. 12, 2009, entitled "INFRARED TOUCHSCREEN," which is herein incorporated by reference in its entirety.

BACKGROUND

Embodiments of the present invention relate to touchscreen displays that utilize optoelectronic devices to detect touches on a display screen. Touchscreen displays typically include a display screen that presents information to a user and touchscreen electronics for detecting touches on the display screen. The touchscreen display may be attached to or otherwise coupled with an electronic device that performs various functions and controls the information displayed on the display screen. The user may respond to questions, enter data, or otherwise operate the electronic device by touching or physically contacting a portion of the display screen.

SUMMARY

Embodiments of the present invention provide touchscreen electronics for detecting touches on a display screen, the touchscreen electronics broadly comprising a plurality of transmitters, a plurality of receivers, and a controller. Each transmitter may transmit at least one beam across the display screen, wherein the beam may be switched on and off in a repeated pattern. The receivers may detect the beams from the transmitters, and each receiver may generate an "on" value that corresponds to the beam being switched on and an "off" value that corresponds to the beam being switched off. The controller communicates with the transmitters and the receivers and may be configured to determine that a touch has occurred based on registering interrupted and/or uninterrupted beams. With this configuration, actual touches on the display screen can be more accurately distinguished from "false" touches caused by excessive ambient light, debris, water spray, and other factors associated with various environments in which the touchscreen display may be used.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Various embodiments of the present invention may include a touchscreen display for use with an electronic device. The touchscreen display broadly comprises a display screen and touchscreen electronics for detecting touches on the display screen. The touchscreen electronics may comprise a plurality of transmitters, a plurality of receivers, and a controller. Each of the transmitters may be configured to transmit a beam across the display screen, wherein the beam may be switched on and off in a regular pattern. Each of the receivers may receive the beam from at least one of the transmitters and may be operable to generate an "on" value that corresponds to the beam being switched on and an "off" value that corresponds to the beam being switched off. In various embodiments, the transmitters may be configured to transmit and the receivers may be configured to receive infrared (IR) wavelength beams. The controller may communicate with the transmitters and receivers and may be configured to determine that a touch has occurred based on registering interrupted and/or uninterrupted beams.

In some embodiments, the transmitters are placed along all sides of the display screen. The receivers are placed along the sides of the display screen, generally interleaved with the transmitters, such that one receiver is positioned between two transmitters. During operation, each transmitter transmits a beam that is received by a portion of the receivers. Thus, a pattern of crisscrossing beams is created close to the surface of the display screen. When a user touches the display screen, a portion of the beams is broken. "Touch," as utilized herein, refers to a user physically contacting the display screen with his or her finger or another object and/or placing his or her finger or another object in close proximity to the display screen without physically contacting the display screen. As a result of a touch, the receivers on one or more sides of the display screen no longer receive the transmitted signals. The touchscreen electronics may use the location of the inactive receivers to determine the coordinates of the point of display screen contact.

The touchscreen display may be utilized in a variety of environments and thus may encounter various situational problems. For example, in a marine environment, the touchscreen display may be exposed to steam, mist, or water spray. In colder environments, condensation or frost may form on the display screen. In any environment, including aviation environments, the touchscreen display may encounter sunlight, smoke, or liquid spills, while debris, dust, dirt, sand, or other objects may collect on the display screen. All of these factors may adversely affect the performance of conventional touchscreen displays, either by creating false touches on the display screen or by preventing the ability to detect an actual touch.

Figure 1:
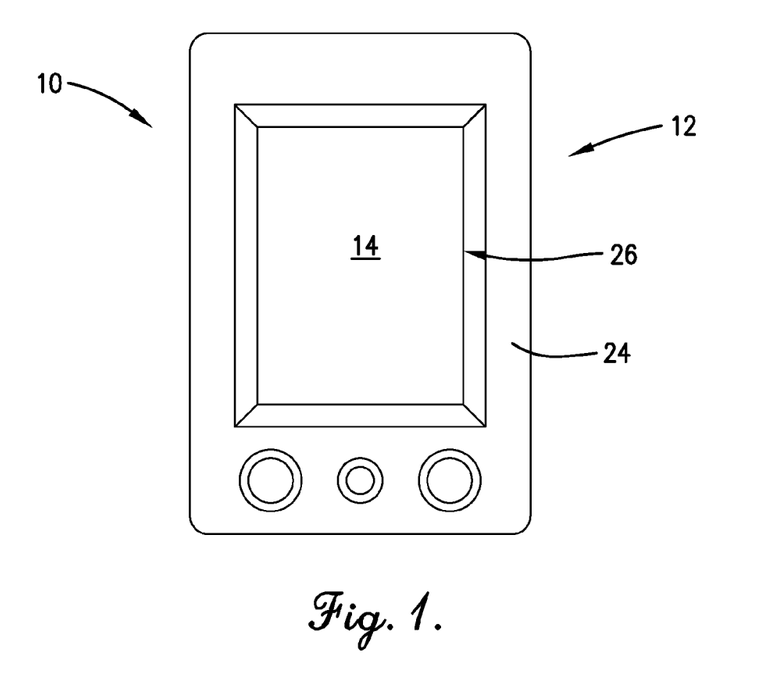
FIG. 1 is a top view of an electronic device in which the touchscreen electronics configured in accordance with various embodiments of the present invention may be implemented.
Figure 4:
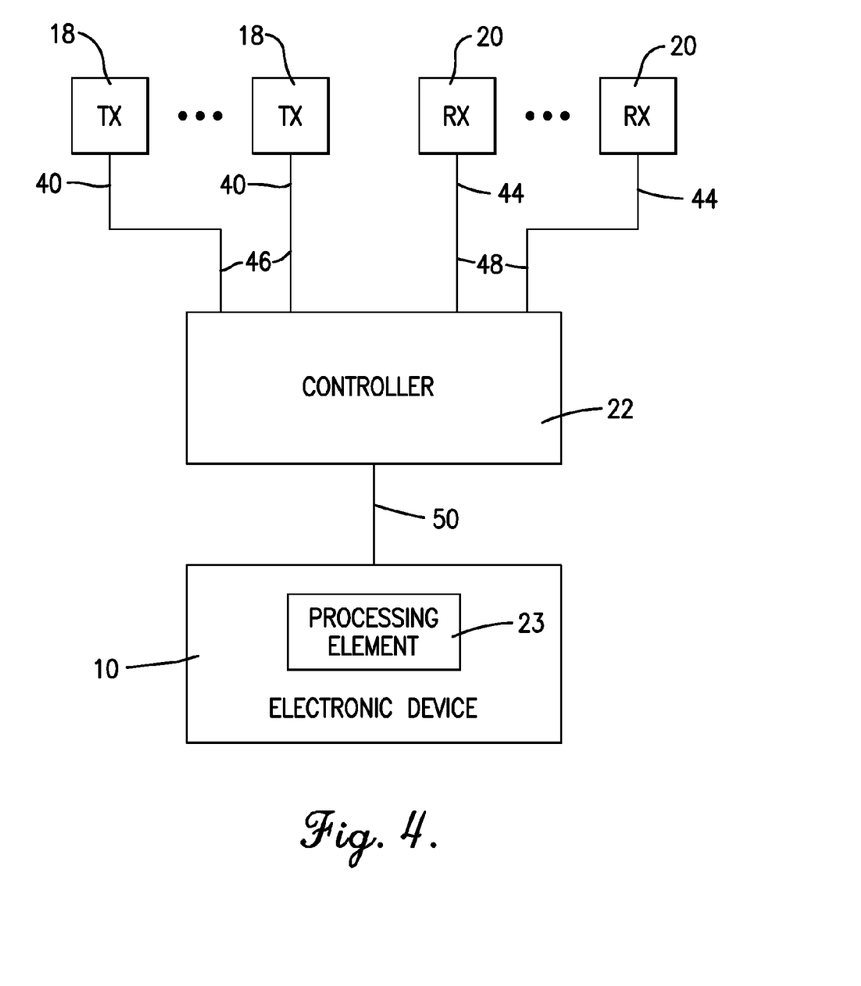
FIG. 4 is a block diagram of the electronic device and the touchscreen electronics in accordance with various embodiments of the present invention.

Embodiments of the technology will now be described in more detail with reference to the drawing figures. Referring initially to FIG. 1, an electronic device 10 in which the touchscreen display 12 of the present invention may be integrated is illustrated. Embodiments of the touchscreen display 12 may comprise a display screen 14 and touchscreen electronics 16. As described in more detail below, the touchscreen electronics 16 may broadly comprise a plurality of transmitters 18, a plurality of receivers 20, and a controller 22, as seen in FIG. 4.

The electronic device 10 may be any device that presents visual information to a user and with which the user may interact. Examples of the electronic device 10 include commercial, retail, or public information kiosks located in banks, shopping malls, airports, and the like, computing devices such as a desktop computer or a laptop computer, medical test or diagnostic equipment used in a hospital or laboratory, navigation and instrumentation equipment used in an aircraft, marine vessel, or automobile, and similar electronic components.

The electronic device 10 may include components not necessarily shown in the figures, such as inputs, outputs, and communication ports. Inputs may include knobs, dials, switches, keypads, keyboards, mice, joysticks, combinations thereof, and the like. Outputs may include audio speakers, lights, dials, meters, printers, combinations thereof, and the like. Communication ports may be wired or wireless, electronic, optical, radio frequency (RF), combinations thereof, and the like.

The electronic device 10 may also include a processing element 23 that performs logical functions and controls the information and data that is displayed on the display screen 14. The information and data displayed may depend on computer programs, software, or code that is executed by the electronic device 10, input from users utilizing the inputs discussed above, input from the touchscreen electronics 16 of the current invention generated from users touching the display screen 14, and combinations thereof. The processing element 23 may include microprocessors, microcontrollers, or similar components that are capable of executing computer programs, software, or code. The processing element 23 may further include data storage components such as read-only memory (ROM), random-access memory (RAM), hard-disk drives, optical disk drives, flash memory drives, combinations thereof, and the like.

Figure 2:
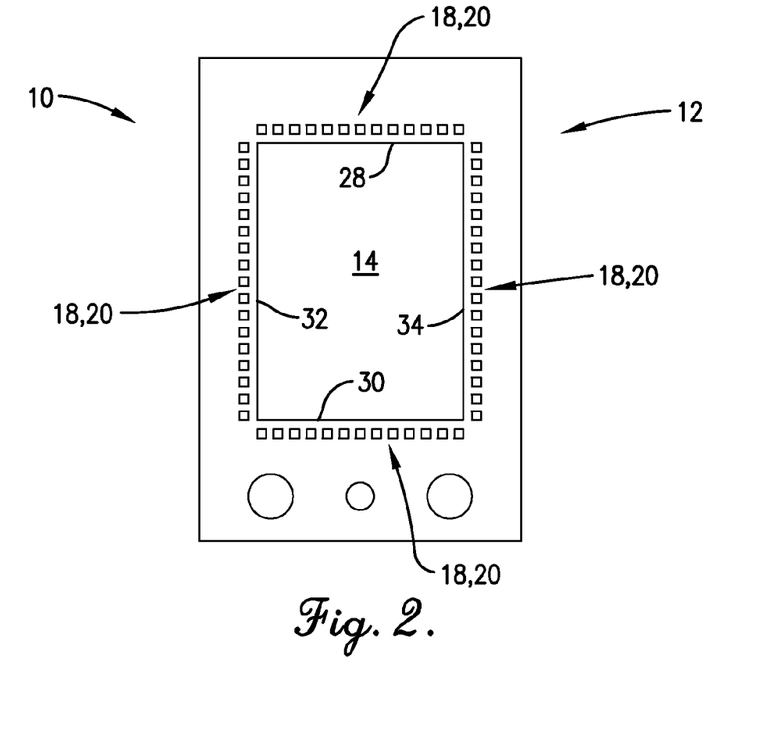
FIG. 2 is a top view of the electronic device with a front cover removed to show the transmitters and receivers of the touchscreen electronics positioned adjacent to the edges of a display screen.
Figure 3:
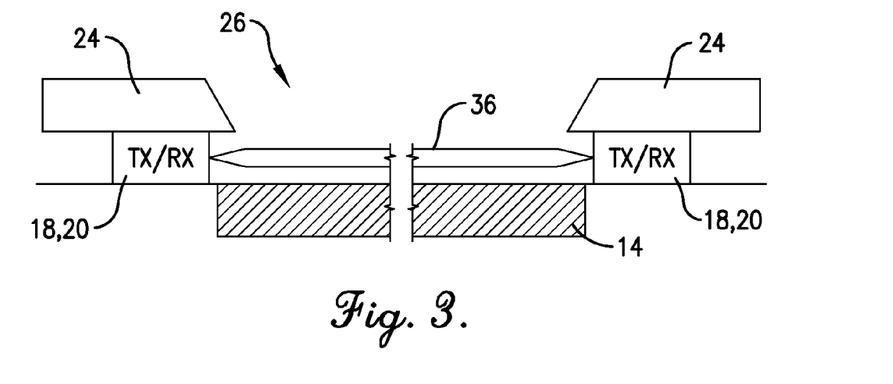
FIG. 3 is a schematic sectional view of the touchscreen display showing the transmitters and receivers positioned at the edge of the display screen and underneath the front cover of the electronic device.

The electronic device 10 may further include a cover 24 that is shown in FIG. 1, but is removed in FIG. 2 to reveal the transmitters 18 and the receivers 20. The cover 24 generally provides protection for the transmitters 18, the receivers 20, the display screen 14, and any other components in the vicinity thereof. In some embodiments, the cover 24 may include or form a bezel. The cover 24 may have a shape that conforms to a housing or a body of the electronic device 10 to which the cover 24 may be attached. The cover 24 may include a window 26 or opening that aligns with the display screen 14. The window 26 may have a similar size and aspect ratio as the display screen 14. In order to accommodate the operation of the transmitters 18 and the receivers 20, the cover 24 may be shaped so that the window 26 does not contact the display screen 14 and allows some space therebetween. In some embodiments, the space between the window 26 and the display screen 14 may be empty. In other embodiments, there may be a transparent gasket or seal between the window 26 and the display screen 14. Furthermore, when the touchscreen display 12 is finally assembled, the cover 24 may be positioned over the transmitters 18 and the receivers 20, as seen in FIG. 3. Accordingly, the user may not be able to see or access the transmitters 18 and the receivers 20.

The display screen 14 may display information or data encouraging the user to interact with the electronic device 10. The information may include questions or statements that prompt the user to touch the display screen 14. The information may also include on-screen keyboards, numeric or alphanumeric keypads, menuing systems, popup windows, and the like. Thus, the user may touch the display screen 14 to respond to prompts or questions, type text, enter numbers, activate menus, open windows or dialog boxes, scroll through lists, or similar activities. Thus, the electronic device 10 may be controlled by or may operate in response to touches on the display screen 14.

The display screen 14 may be of a variety of types, including, but not limited to, a cathode ray tube (CRT), plasma, light-emitting diode (LED), organic LED (OLED), LEP (Light Emitting Polymer) or PLED (Polymer LED), liquid crystal display (LCD), thin film transistor (TFT) LCD, LED side-lit or back-lit LCD, combinations thereof, and the like. In various embodiments, the display screen 14 may be integral with the electronic device 10, as shown in FIGS. 2-3 and exemplified by a device such as a multi-use avionics-system controller. In other embodiments, the display screen 14 may be separate from the electronic device 10, such as with a computer monitor or other video monitor.

The display screen 14 is generally flat to accommodate the operation of the touchscreen electronics 16, as discussed in more detail below. The display screen 14 may have multiple sides but is typically four-sided with a top side 28, a bottom side 30, a left side 32, and a right side 34. The display screen 14 may possess a square or a rectangular aspect ratio and may be viewed in either a landscape or a portrait mode.

Figure 5:
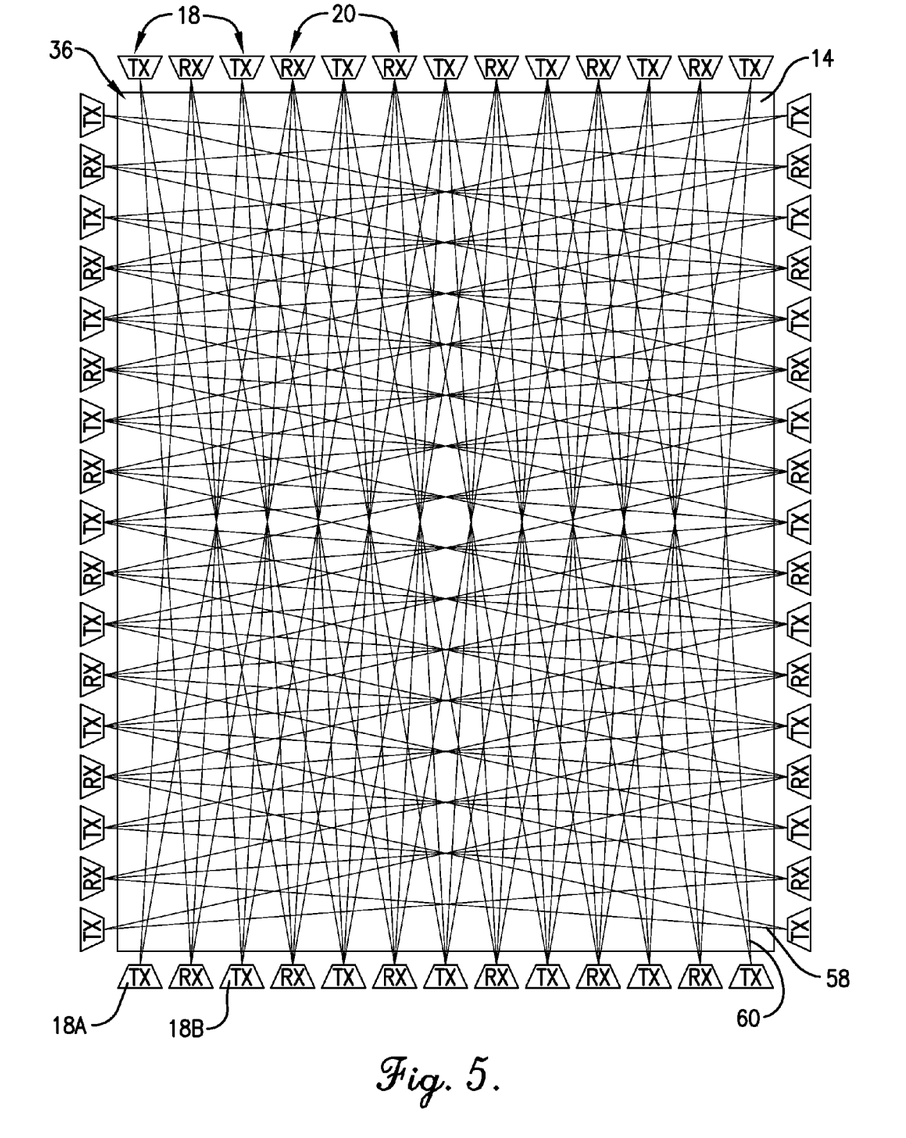
FIG. 5 is a schematic view of the display screen, the transmitters, and the receivers depicting a beam pattern created by the touchscreen electronics.

The transmitters 18, also designated as "TX", and the receivers 20, also designated as "RX", may be positioned along one or more sides of the perimeter of the display screen 14 as seen in FIGS. 2, 5, and 10-11 such that the transmitters 18 may transmit beams 36 across the display screen 14 to the receivers 20, as shown in FIGS. 3 and 5. Typically, the transmitters 18 and the receivers 20 are placed such that they are adjacent to the entire perimeter of the display screen 14. Accordingly, the number of transmitters 18 and receivers 20 may depend on the magnitude of the perimeter, the size of each transmitter 18 and receiver 20, and the space between each device. Other factors may influence the number of transmitters 18 and receivers 20, such as minimizing power consumption of the touchscreen display 12, in which case the number of transmitter 18 and receivers 20 may be reduced.

Generally, the transmitters 18 and the receivers 20 are placed with the transmitters 18 being interleaved with the receivers 20, such that one receiver 20 is positioned between two transmitters 18 and vice versa. The beam 36 from the transmitter 18 may have a conical shape in general or a triangular shape when viewed in a plane. Thus, the beam 36 from one transmitter 18 may reach several receivers 20 on the other side of the display screen 14. As a result, several beams 36 may be formed between one transmitter 18 and the receivers 20 on the opposing side. For example, as seen in FIG. 5, one beam 36 may be formed between one transmitter 18 and each of four receivers 20 to produce a total of four beams 36, although this number may decrease near the corners of the display screen 14. Furthermore, each receiver 20 may receive a beam 36 from multiple transmitters 18. Hence, there may be multiple beams 36 that lead to one receiver 20. For example, as seen in FIG. 5, each receiver 20 may receive four beams 36, except in the vicinity of the corners of the display screen 14 where the number of beams 36 per receiver 20 decreases.

Figure 6:
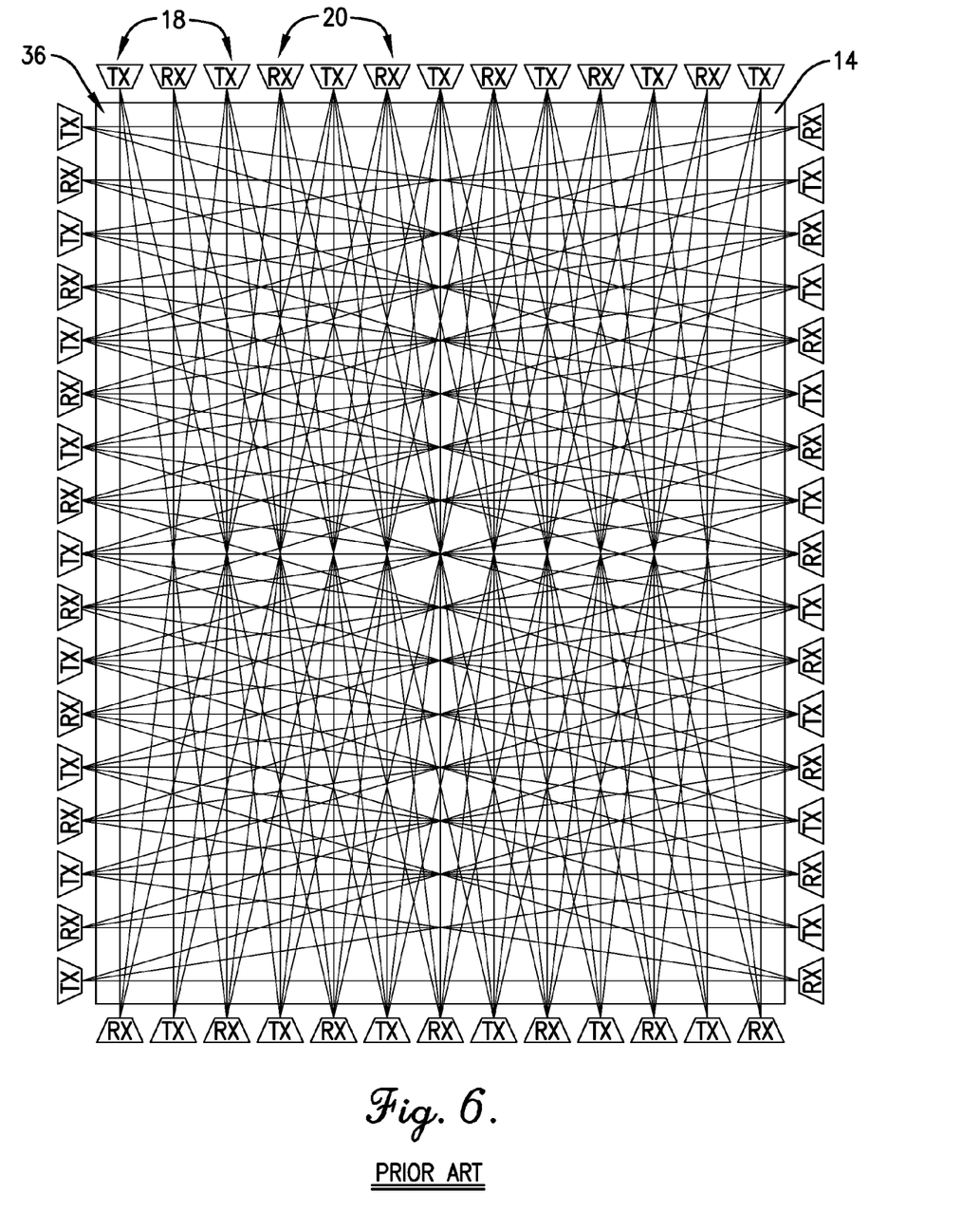
FIG. 6 is a schematic view of the beam pattern created by a prior art array of transmitters and receivers.

In various embodiments, the transmitters 18 may be positioned along one side of the display screen 14 substantially linearly aligned with the transmitters 18 along the opposite side of the display screen 14. Likewise, the receivers 20 may be substantially linearly aligned with receivers 20 along opposing sides of the display screen 14. This orientation may produce the pattern of beams 36 shown in FIG. 5, and may be contrasted with prior art transmitter 18 and receiver 20 orientations wherein the transmitters 18 may be substantially linearly aligned with the receivers 20 along opposing sides of the display screen 14, which produces the pattern of beams 36 shown in FIG. 6. Aligning the transmitters 18 with other transmitters 18 and the receivers 20 with other receivers 20 generally provides better coverage of the display screen 14 with the beams 36 such that there are smaller areas where no beams are present as compared with the prior art.

Each of the transmitters 18 generally transmits a beam 36 that corresponds to a transmit signal 38 from the controller 22. The transmit signal 38 may be received by a transmitter input 40. Each transmitter 18 may receive the transmit signal 38, either as a voltage or a current, from the controller 22 and generate the corresponding beam 36 with an intensity that is proportional to the magnitude of the transmit signal 38—typically in the infrared (IR) wavelength range of approximately 700 nanometers (nm) to approximately 1500 nm. The beam 36 may be considered to be an optical transmission and thus the transmitter 18 may include light-emitting diodes (LEDs), surface-emitting or edge-emitting lasers, similar optoelectronic devices, or combinations thereof.

Figure 7:
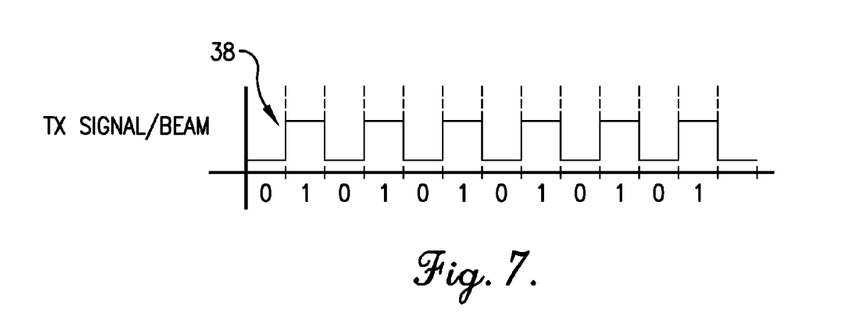
FIG. 7 is a plot of a transmit signal and a beam of one of the transmitters vs. time.

The transmit signal 38 from the controller 22 may be a binary square wave signal that includes a zero portion and a one portion, designated as "0" and "1", respectively, in FIG. 7, wherein the transmit signal 38 oscillates between zero and one at a given frequency. The zero portion of the transmit signal 38 may be a zero amplitude or near-zero amplitude value. The one portion of the transmit signal 38 may be a high amplitude value.

Accordingly, the behavior of the beam 36 may follow the waveform of the transmit signal 38, as shown in FIG. 7. Typically, the beam 36 is off during the zero portion of the transmit signal 38. In some embodiments, the beam 36 may have a very low intensity during the zero portion. And, the beam 36 may be on or radiating during the one portion of the transmit signal 38 at a higher intensity proportional to the value of the transmit signal 38. Thus, the beam 36 may be switched on and off at the frequency of the transmit signal 38.

Each of the receivers 20 may produce a receive signal 42 that is communicated through a receiver output 44 and corresponds to radiation detected by a sensing surface of the receiver 20. The receiver 20 may include photodetectors, photocells, phototransistors, photoresistors, photodiodes, other photosensitive materials that may detect IR radiation, or combinations thereof. The receiver 20 may produce the receive signal 42 as an analog electrical or electronic output, either voltage or current, that corresponds to the detected radiation.

Figure 8:
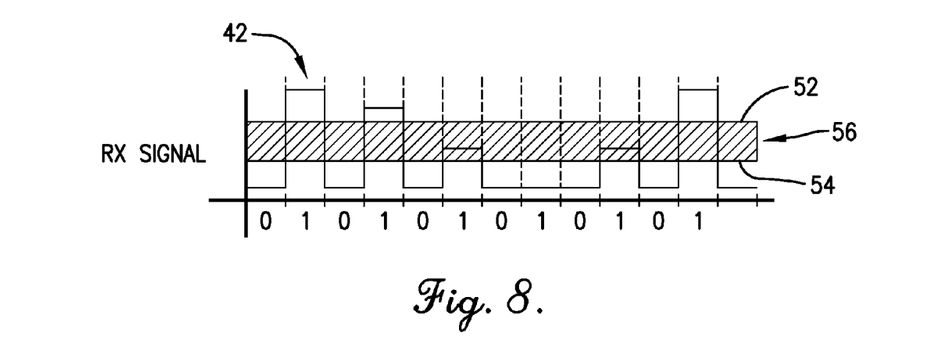
FIG. 8 is a plot of a receive signal of one of the receivers vs. time depicting a touch on the display screen.

The receive signal 42 may include a zero portion and a one portion that correspond to the zero portion and the one portion of the transmit signal 38, generally shown in FIG. 8. During the zero portion of the receive signal 42, the receiver 20 may generate an off value that corresponds to the beam 36 being off. During the one portion of the receive signal 42, the receiver 20 may generate an on value that corresponds to the beam 36 being on. The level of the zero value may be zero or nearly zero, and the level of the one value may be proportional to the intensity of the beam 36 that impacts the receiver 20. However, when the beam 36 is interrupted or broken by the user during the act of touching the display screen 14, the on value of the receive signal 42 may be significantly reduced in amplitude to zero or near zero. Thus, during the time in which the user is touching the display screen 14 and the beam 36 is interrupted, both the off value and the on value of the receive signal 42 may have a zero or near-zero amplitude value.

Figure 9:
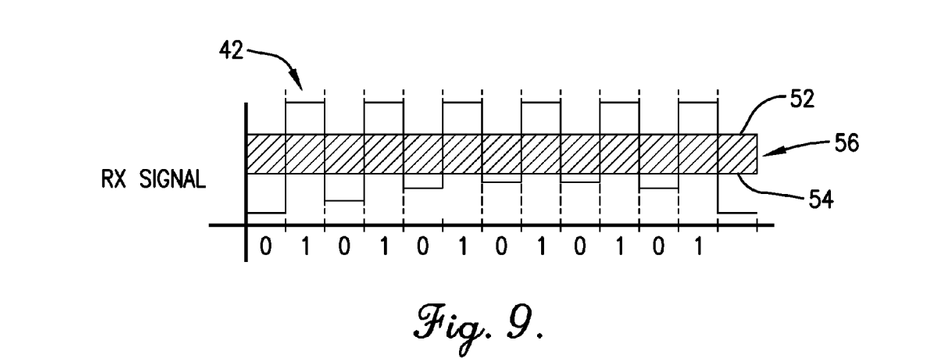
FIG. 9 is a plot of the receive signal vs. time depicting the presence of infrared radiation near the receiver.

Furthermore, since the receive signal 42 generally corresponds to the radiation that strikes the receiver 20, the receive signal 42 may include the waveform of the beam 36 as well as the characteristics of any ambient radiation that may be present in the surroundings of the touchscreen display 12. For example, sunlight is often present in the environments where touchscreen displays 12 are implemented, such as the cockpit of an aircraft, wherein it may also be difficult to prevent sunlight from shining on the touchscreen display 12—particularly at low angles. When sunlight shines on the display screen 14, it may also contact at least a portion of the receivers 20. Sunlight typically includes a sufficient amount of IR radiation to affect the receive signal 42 and may provide a constant IR input to the receiver 20, which effectively raises the floor of the receive signal 42 waveform. Therefore, in the presence of sunlight, the amplitude of the off value of the receive signal 42 may increase to a higher level, as shown in FIG. 9.

The controller 22 may include digital to analog converters (DACs), analog to digital converters (ADCs), signal amplifiers, drivers, similar electrical or electronic circuits, or combinations thereof. The controller 22 generally sends the transmit signal 38 to the transmitters 18 and receives the receive signal 42 from the receivers 20. Accordingly, the controller 22 may include a plurality of outputs 46 that are coupled to the transmitter inputs 40 and a plurality of inputs 48 that are coupled to the receiver outputs 44. The transmit signal 38 and the receive signal 42 may include a variable analog voltage or current level.

The controller 22 may also include a data output 50 to send information to the electronic device 10, such as the location on the display screen 14 where a touch occurred. In order to determine the location of a touch and perform other functions, the controller 22 may execute computer programs, software, code, instructions, algorithms, or firmware, and combinations thereof. The controller 22 may include hardware that automatically performs instructions, such as finite state machines (FSMs). The controller 22 may also include microprocessors, microcontrollers, field-programmable gate arrays (FPGAs), application-specific integrated circuits (ASICs), combinations thereof, and the like, and may be implemented using hardware description languages (HDLs), such as Verilog and VHDL. The controller 22 may further include data storage components such as read-only memory (ROM), random-access memory (RAM), hard-disk drives, optical disk drives, flash memory drives, combinations thereof, and the like. In addition, the controller 22 may include communication ports to allow for programming or other miscellaneous functions.

The touchscreen display 12 may function as follows. The controller 22 may send the transmit signal 38 to a first transmitter 18A, which may be any of the transmitters 18. For ease of understanding, the first transmitter 18A may be located near a corner of the display screen 14. The transmit signal 38 may be a square wave with a zero portion and a one portion, as seen in FIG. 7, wherein the controller 22 sets the value of the transmit signal 38 during both the zero portion and the one portion. During the zero portion, the value of the transmit signal 38 may be zero or approximately zero in order to turn the first transmitter 18A off. During the one portion, the transmit signal 38 may be set to a value to drive the transmitter 18A to produce an intensity of the beam 36 that can easily be detected by the receivers 20.

The beam 36 transmitted by the first transmitter 18A may be received by multiple receivers 20 on the opposing side of the display screen 14, in effect creating multiple beams 36—one beam 36 for each receiver 20. An exemplary pattern of beams 36 created by the transmitters 18 and the receivers 20 is shown in FIG. 5. As can be seen, the number of beams 36 between a transmitter 18 and multiple receivers 20 depends primarily on the location of the transmitter 18.

For each receiver 20 that receives a beam 36 from the first transmitter 18A, the controller 22 checks the receive signal 42 generated by the given receiver 20. As discussed in more detail below, if the on value of the receive signal 42 is greater than an upper break band 52 and the off value of the receive signal 42 is less than a lower break band 54, then it is likely that the beam 36 is uninterrupted and that nothing is touching the display screen 14 along the path of the given beam 36. The controller 22 checks the receive signal 42 of the next receiver 20 to receive a beam 36 from the first transmitter 18A. If the off value and the on value of the receive signal 42 are within acceptable parameters, then the controller 22 checks the next receiver 20 to receive a beam 36 from the first transmitter 18. In a likewise fashion, the controller 22 checks all the receive signals 42 of the receivers 20 receiving the beam 36 from the first transmitter 18A. If the receive signals 42 are all acceptable, then the controller 22 sends a transmit signal 38 to a second transmitter 18B.

The controller 22 then checks the receive signals 42 of all the receivers 20 receiving the beam 36 from the second transmitter 18B. The controller 22 continues to send a transmit signal 38 to each transmitter 18 in a serial fashion and check the receive signals 42 from the corresponding receivers 20. The process continues until an event occurs, as described below.

In certain situations, the value of the receive signal 42 may not fall within acceptable limits. For example, when the touchscreen display 12 is exposed to direct sunlight or other sources of IR radiation, the off value of the receive signal 42 may rise or increase. Alternatively, the intensity of the beam 36 produced by a given transmitter 18 may vary due to process variations in the manufacture of the transmitters 18, such that for the same value of input in the transmit signal 38, some transmitters 18 may generate a beam 36 with a lower intensity. Consequently, the on value of the receive signal 42 may be reduced as well. These changes in the levels of the signal 42 may lead to errors in performance of the touchscreen display 12, wherein the controller 22 may falsely determine that a touch has occurred when nothing has contacted the display screen 14 or may not detect a touch when a user has touched the display screen 14.

In order to tolerate changes in the expected levels of the receive signal 42, the controller 22 compares the values of the receive signal 42 to the upper break band 52 and the lower break band 54, as seen in FIGS. 8-9. The upper break band 52 may be a number above which the on value of the receive signal 42 is acceptable. Thus, the receiver 20 is properly receiving the beam 36 from the transmitter 18. The lower break band 54 may be a number below which the off value of the receive signal 42 is acceptable. In other words, the output of the receiver 20 indicates that the beam 36 is off when it should be off. The range of values between the upper break band 52 and the lower break band 54 may be a break band 56. Values of the receive signal 42 that are in the break band 56 may be considered indeterminate.

The levels of the upper break band 52 and the lower break band 54 may be set by the manufacturer after assembly of the touchscreen display 12. The value of the upper break band 52 may be set by recording the on value of each receive signal 42 for each beam 36 with none of the beams 36 being interrupted. The upper break band 52 value may be set to less than the smallest on value of the receive signal 42 for all the beams 36. The setting of the upper break band 52 increases the tolerance of the touchscreen display 12 to variations in the performance of the transmitters 18. The value of the lower break band 54 may be set by exposing the touchscreen display 12 to a source of IR radiation, such as sunlight, and recording the off value of the receive signal 42 for each beam 36 when all of the beams 36 are blocked. Alternatively, the value of the receive signal 42 for each beam 36 may be recorded when all the transmitters 18 are off and no beams 36 are transmitted. The lower break band 54 value may be set to greater than the highest off value of the receive signal 42 for all the beams 36. The setting of the lower break band 54 increases the tolerance of the touchscreen display 12 to the effects of sunlight or other IR radiation sources.

When a user touches the display screen 14, at least two touch events may occur. The first touch event may include the user placing his finger or a pointing object, such as a stylus, on the display screen 14. The second touch event may include the user removing his finger or the pointing object from the display screen 14.

When the first touch event occurs, one or more beams 36 may be interrupted. When a beam 36 is interrupted, the on value of the receive signal 42 from the corresponding receiver 20 may be reduced to zero or near zero, which is typically below the lower break band 54. Since the receive signal 42 is normally a square wave when the corresponding beam 36 is uninterrupted, the controller 22 expects that the on value of the receive signal 42 should be above the upper break band 52. Thus, the controller 22 may determine or register that a beam 36 has been interrupted, signifying that a touch may have been initiated and that a touch event has occurred, when the on value of the receive signal 42 is below the lower break band 54, as shown in the middle portion of FIG. 8. The initiation of a touch may also be known as a downstroke. It is possible that the on value of the receive signal 42 may not transition to below the lower break band 54 in one cycle, or in other words, the beam 36 may not be fully blocked by the user's touch in one cycle. It may take a few cycles for the transition to occur, during which time the on value of the receive signal 42 may gradually decrease through the break band 56, as seen in the left portion of FIG. 8. The controller 22 may be implemented or programmed to allow for the gradual decrease of the receive signal 42 over a few cycles. However, if the receive signal 42 when the beam 36 is on takes an excessive amount of time to transition, during which the value of the receive signal 42 is in the break band 56, then the controller 22 may determine that there is a problem with the beam 36, as discussed below.

The on value of the receive signal 42 may remain below the lower break band 54 while the user is touching the display screen 14 and interrupting the corresponding beam 36. When the user lifts his finger from the display screen 14, or terminates the touch, the beam 36 may no longer be interrupted. As a result, the on value of the receive signal 42 may increase and transition to be greater than the upper break band 52, and the controller 22 may determine or register that the beam 36 is no longer interrupted and has been restored, signifying that the touch has been terminated and a touch event has occurred. The termination of a touch may also be known as an upstroke. Like the downstroke, the upstroke may occur over a number of cycles of the square wave of the receive signal 42. Hence, the on value of the receive signal 42 may gradually increase during a few cycles, as seen in the right portion of FIG. 8.

When the controller 22 determines that a beam 36 has been interrupted, the controller 22 continues to check the values of other receive signals 42 for indications of interrupted beams 36, as typically a touch interrupts a plurality of beams 36. The beams 36 may include X beams 58 and Y beams 60. The X beams 58 may travel roughly horizontally and may be transmitted by transmitters 18 positioned adjacent to the left side 32 and the right side 34 of the display screen 14. The Y beams 60 may travel roughly vertically and may be transmitted by transmitters 18 positioned adjacent to the top side 28 and the bottom side 30 of the display screen 14. To determine that the interruption of a plurality of beams 36 is a valid touch, the controller 22 checks for at least one interrupted beam 36 in a first direction and at least two interrupted beams 36 in the orthogonal direction. Thus, the controller 22 determines the downstroke is valid when there are at least two X beams 58 and one Y beam 60 that are interrupted or at least two Y beams 60 and one X beam 58 that are interrupted.

Figure 10:
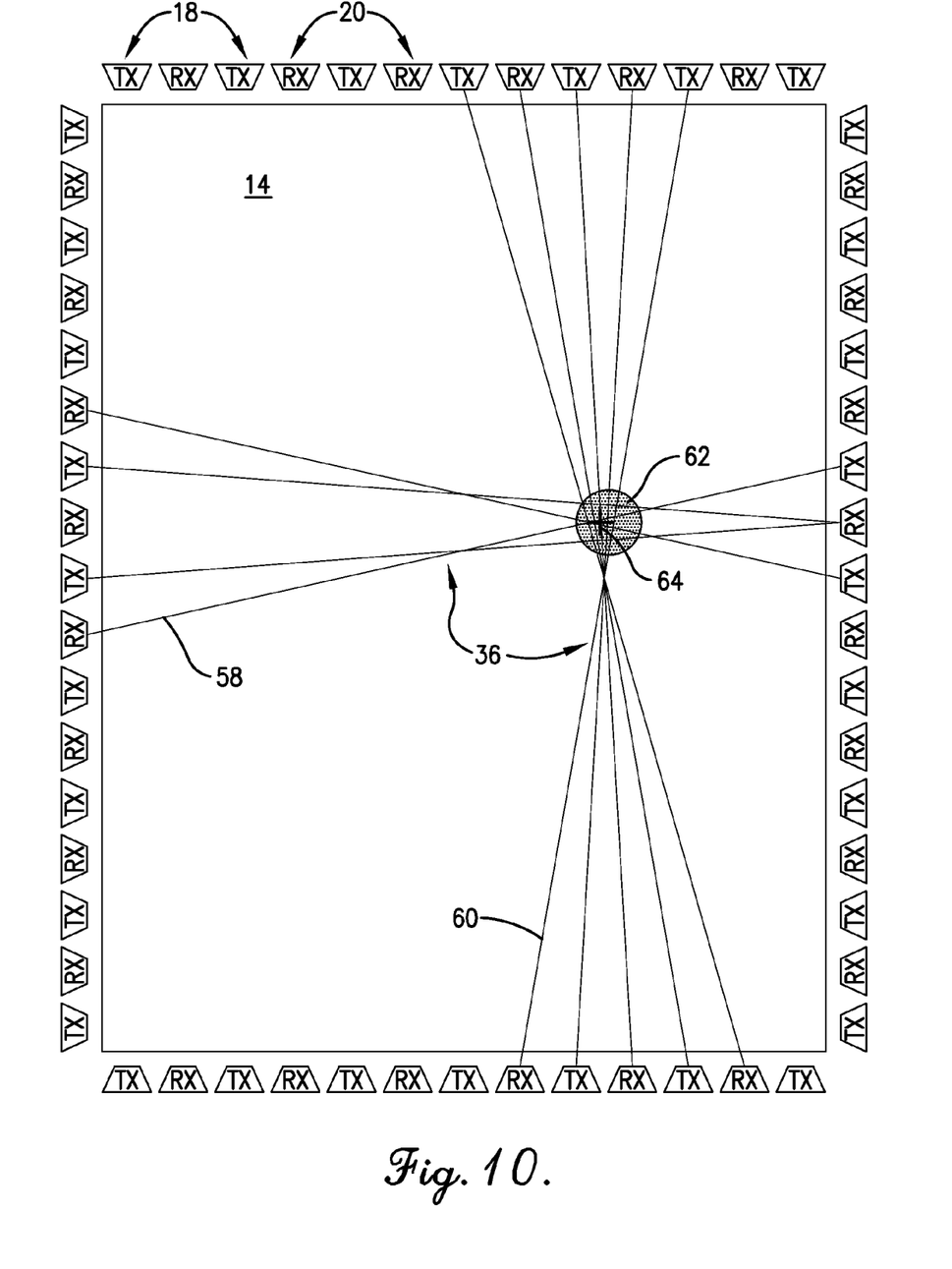
FIG. 10 is a schematic view of the display screen, the transmitters, and the receivers depicting a touch on the display screen.

FIG. 10 depicts an actual touch 62 on the display screen 14 from the user's fingertip, for example, as well as a calculated touch 64 and the beams 36 that are interrupted by the fingertip. One possible approach to determining the calculated touch 64 may be to average the locations of the intersections of the beams 36. However, as can be seen, some of the locations where X beams 58 intersect with X beams 58 and Y beams 60 intersect with Y beams 60 are located at a distance away from the actual touch 62. Including these intersections in the computation of the calculated touch 64 may lead to inaccuracies and additional calculation time. Thus, the controller 22 includes only the locations of the intersections of X beams 58 with Y beams 60 in computing the calculated touch 64. In various embodiments, the calculated touch 64 may be calculated as the average of the points where the X beams 58 intersect with the Y beams 60. Once determined, the calculated touch 64 may be communicated to the electronic device 10 through the data output 50.

Once the controller 22 has determined that a valid downstroke has occurred, the controller 22 may develop a list of beams 36 that have been interrupted. Since the controller 22 considers only the intersection of X beams 58 with Y beams 60 in computing the calculated touch 64, then the controller 22 must ascertain the coordinates of each X beam 58-Y beam 60 intersection. One approach to determining the X beam 58-Y beam 60 intersection points may be to calculate the intersection given the path of each beam 36. However, this approach may require excessive processing time for each occurrence of a touch. Instead, given that the positions of the transmitters 18 and the receivers 20 are fixed and the trajectories of the beams 36 do not change, the controller 22 may calculate the X beam 58-Y beam 60 intersection points just once when the touchscreen display 12 starts up. The controller 22 may then store the intersection points in a lookup table memory element internal to the controller 22. Thereafter, the controller 22 may simply retrieve the intersection points from the memory element when computing the calculated touch 64.

During the normal operation of the touchscreen display 12, it is possible for environmental factors to impact the performance of the display 12. In certain environments, frost crystals may develop on the display screen 14. The growth of the crystals may be slow, and as the frost is developing, it may not fully block any of the beams 36, but rather one or more of the beams 36 may be partially blocked, thereby reducing the intensity of the beams 36 that strikes the receivers 20. As a result, the on value of the receive signal 42 may decrease slowly over time until the value is in the break band 56, where it may remain for a long period of time. During a valid touch, the on value of the receive signal 42 may transition from greater than the upper break band 52 through the break band 56 to less than the lower break band 54. Typically, however, the transition occurs within a few cycles of the square wave from the transmitter 18. Thus, the controller 22 may assume that there is a problem if the on value of the receive signal 42 is in the break band 56 for more than a few cycles. If the on value of the receive signal 42 remains in the break band 56 for greater than a predetermined period of time, then the controller 22 may consider the corresponding beam 36 to be inoperable and may remove the beam 36 from consideration when computing the next calculated touch 64. The predetermined period of time may be given as a certain number of cycles of the square wave, or it may be given as an absolute quantity of time such as 5 seconds.

Other factors that may affect the performance of the touchscreen display 12 include smoke in the vicinity of the display screen 14, dust that collects on the display screen 14, water or other liquids that land on the display screen 14, or similar objects that may contact the display screen 14 and remain there. Objects such as these may fully or at least mostly block one or more beams 36 for an extended period of time—typically longer than the time for a valid touch to occur. Thus, the controller 22 may determine that a downstroke has occurred while waiting for the upstroke to occur. In this instance, the on value of the receive signal 42 may be less than the lower break band 54 for an extended period of time. If the on value of the receive signal 42 is less than the lower break band 54 for an extended period of time, then the controller 22 may consider the corresponding beam 36 to be inoperable due to debris on the display screen 14 and may remove the beam 36 from consideration when computing the next calculated touch 64. The predetermined period of time may be given as a certain number of cycles of the square wave, or it may be given as an absolute quantity of time such as 5 seconds.

In various configurations, the controller 22 may register an interrupted beam when the on value generated by one of the receivers 20 transitions in a sequence from greater than the lower break band 54 to less than the lower break band 54, register an uninterrupted beam when the on value generated by one of the receivers 20 transitions in a sequence from less than the upper break band 52 to greater than the upper break band 52, and determine that a touch event has occurred based on at least one of the registered interrupted beam and the registered uninterrupted beam.

In some configurations, the controller 22 may determine that a touch has been initiated when the on value generated by one of the receivers 20 transitions from greater than the upper break band 52 to less than the lower break band 54 and determine that a touch has been terminated when the on value generated by one of the receivers 20 transitions from less than the lower break band 54 to greater than the upper break band 52.

There may be some situations in which the on value of the receive signal 42 for a given beam 36 is less than the lower break band 54 for an extended period of time while there is no debris on the display screen 14. For instance, the user may drag his finger on the display screen 14 along the path of one or more beams 36 in order to perform an action such as scrolling through a list. Usually, during the process, new beams 36 are interrupted that cross the path in which the user is dragging his finger. In the case of contaminants on the display screen 14, no new beams 36 are interrupted other than those that were originally broken by the debris.

When considering whether a beam 36 is inoperable due to debris on the display screen 14, the controller 22 may check for other beams 36 being interrupted during a predetermined window of time. The window may be given as a certain number of cycles of the square wave, or it may be given as an absolute quantity of time. Hence, the controller 22 may consider a beam 36 to be inoperable due to debris on the display screen 14 only if no new beams 36 are interrupted during the window of time. Accordingly, the controller 22 may determine that a drag is occurring if multiple beams 36 are interrupted in succession over a short period of time. The controller 22 may interpret the events as a downstroke followed by a drag followed by an upstroke.

There may be additional events which can affect the performance of the touchscreen display 12. For example, a liquid spill may interrupt a large percentage of beams 36, as might large objects coming into contact with the display screen 14, such as sheets of paper or plastic or articles of clothing, the user's hand accidentally touching the display screen 14, and the like. Thus, if the controller 22 detects that the number of beams 36 that are interrupted at a given time exceeds a predetermined amount, then the controller 22 determine that a spill or a large contact event has occurred and the controller 22 may send a signal to the electronic device 10 that there is a problem with the display screen 14. The predetermined amount of beams 36 may be established by allowing a small number of people to touch the display screen 14 and recording the number of beams 36 that are interrupted by each touch. The predetermined amount of beams 36 may equal the largest number of beams 36 interrupted plus an optional safety value that may be a percentage of the largest number.

Events or circumstances that affect the performance of the touchscreen display 12, such as debris or objects on the display screen 14, are typically not permanent. Frost and liquids may evaporate. Other debris may be removed or the display screen 14 may be cleaned. Once any of the beams 36 has been determined to be stuck in the break band 56 or inoperable due to debris on the display screen 14 or other factors, the controller 22 may monitor the receive signal 42 for the associated beams 36 to check for a return to normal behavior. The controller 22 may determine that a beam 36, previously identified as inoperable, is normal when the on value of the corresponding receive signal 42 is greater than the upper break band 52 for a certain number of cycles. An exemplary number of cycles may be approximately twelve.

Figure 11:
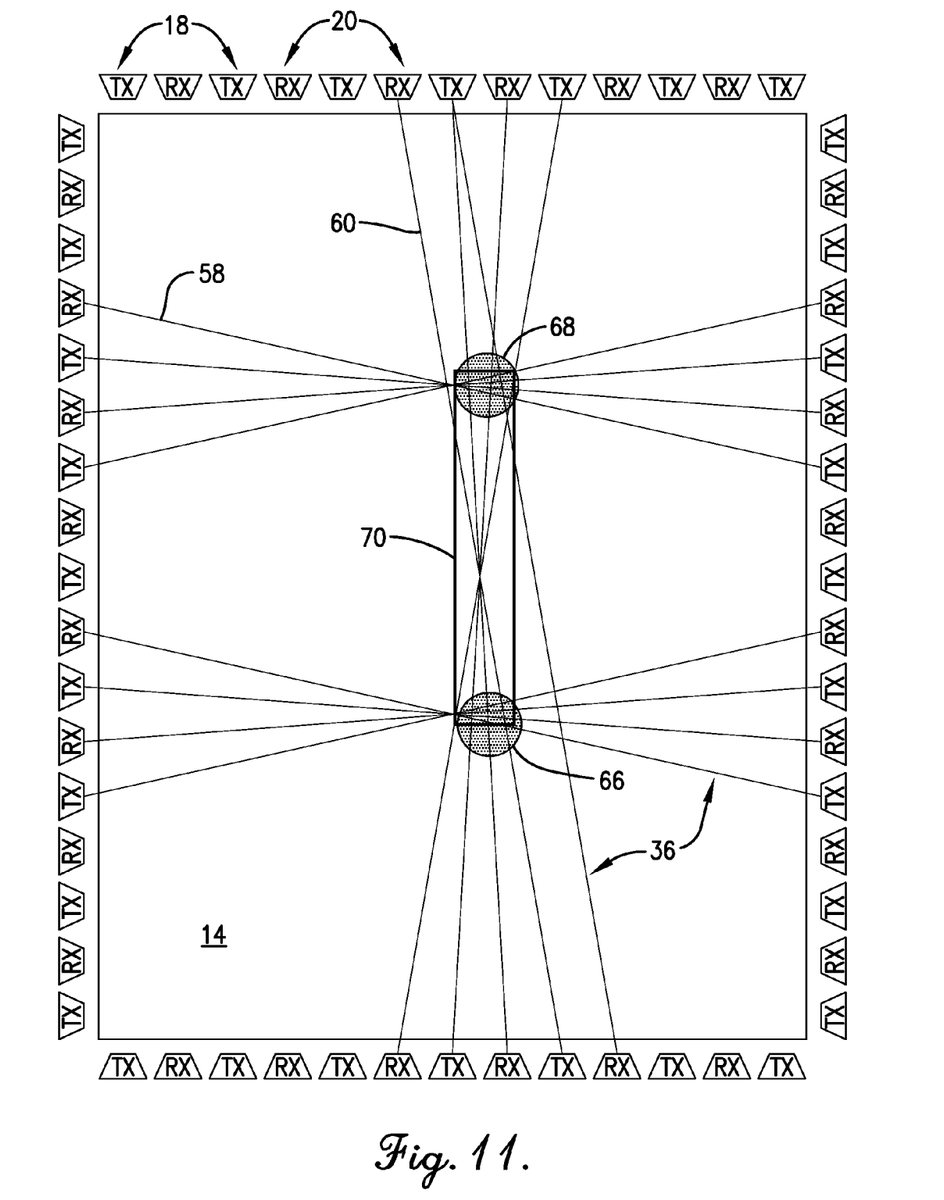
FIG. 11 is a schematic view of the display screen, the transmitters, and the receivers depicting a pinch or an unpinch on the display screen.

In order to perform certain functions of the electronic device 10, such as zooming in or out of an image displayed on the display screen 14, the user may apply a pinching gesture by touching the display screen 14 typically with the thumb and index finger spaced apart and subsequently joining the two together. Additionally, the user may apply an unpinching gesture by touching the display screen 14 typically with the thumb and index finger joined together and subsequently spacing the two apart. FIG. 11 depicts a thumb touch 66 and a finger touch 68 on the display screen 14 along with the beams 36 that are interrupted by the touches 66, 68. The controller 22 may define a bounding box 70 from the extents of the intersections of X beams 58 with Y beams 60 for both the thumb touch 66 and the finger touch 68. From the coordinates of the bounding box 70, the controller 22 may calculate an area of the box 70. If the area of the bounding box 70 increases over time, then the controller 22 may determine that an unpinch is occurring, as the user spreads his thumb and finger apart. If the area of the bounding box 70 decreases over time, then the controller 22 may determine that a pinch is occurring, as the user moves his thumb and finger closer to one another.

In various embodiments, the controller 22 may be able to adjust the performance or the specifications of the transmitters 18 and the receivers 20. For example, the output power of the transmitter 18 and the sensitivity of the receiver 20 may be adjusted. Each transmitter 18 and receiver 20 may include one or more programmable potentiometers which may be used to adjust settings of the transmitter 18 and the receiver 20, such as the gain of amplifiers included in both the transmitter 18 and the receiver 20. It is possible that the touchscreen display 12 may be able to overcome the effects of frost on the display screen 14 by increasing the output power of the relevant transmitters 18 such that the receivers 20 may detect the beam 36 in spite of the frost.

Figure 12:
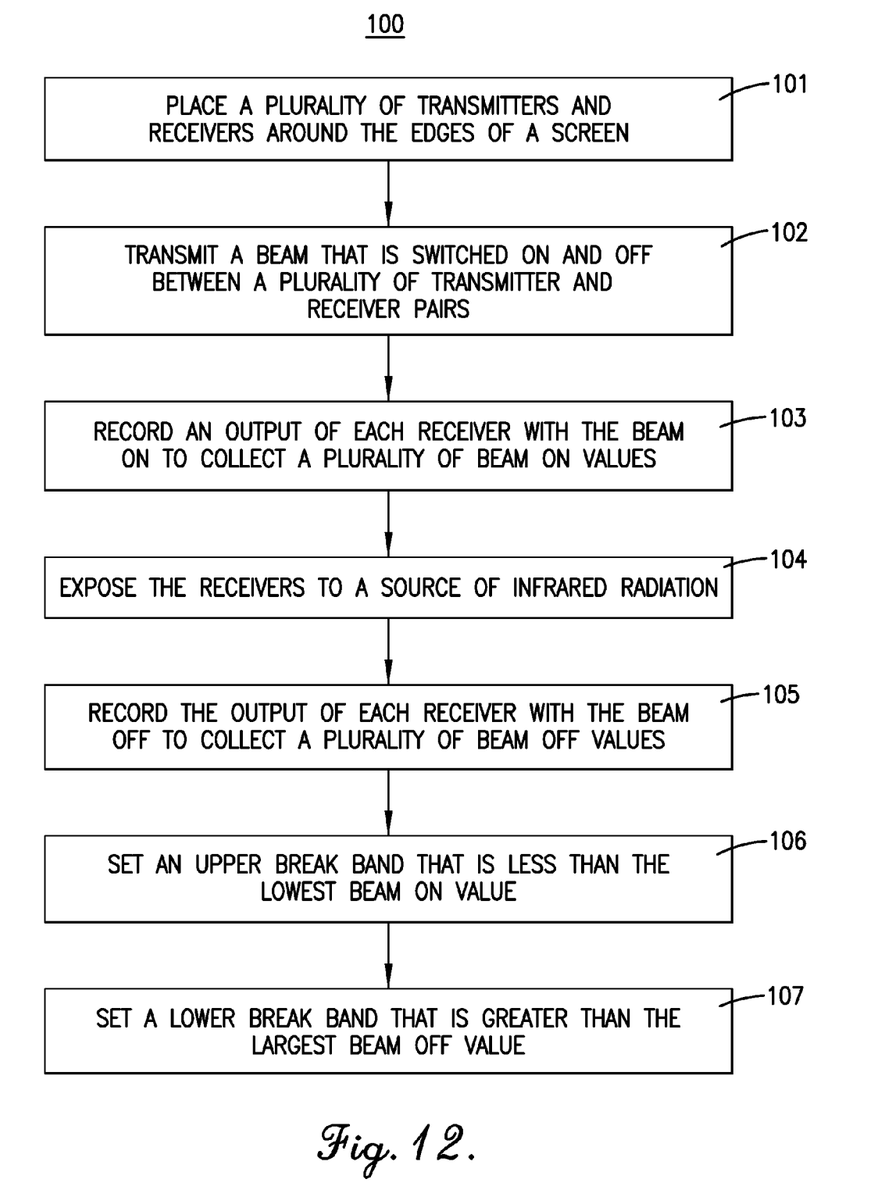
FIG. 12 is a flow diagram of at least a portion of the steps of a method for establishing operating parameters for the touchscreen display.

At least a portion of the steps of a method 100 for establishing operating parameters for a touchscreen display 12 is listed in FIG. 12. The steps may be performed in the order as shown in FIG. 12, or they may be performed in a different order. Furthermore, some steps may be performed concurrently as opposed to sequentially.

In connection with step 101, a plurality of transmitters 18 and a plurality of receivers 20 are placed around the edges of a display screen 14. The transmitters 18 and the receivers 20 may be positioned such that each transmitter 18 is generally opposing one or more receivers 20.

In connection with step 102, a beam 36 that is modulated on and off is transmitted between a plurality of transmitter 18 and receiver 20 pairs. Each transmitter 18 transmits the beam 36 to at least one receiver 20. The beam 36 may be turned on and off in a square wave fashion.

In connection with step 103, an output of each receiver 20 is recorded when the beam 36 is on in order to collect a plurality of beam 36 on values. Each receiver 20 may generate a receive signal 42, which is an electrical or electronic output that corresponds to the intensity of the beam 36 that contacts the receiver 20. The on value of the receive signal 42 may have a high amplitude value.

In connection with step 104, the receivers 20 are exposed to a source of infrared (IR) radiation. Sunlight may include IR radiation. Thus, the touchscreen display 12 may be placed in direct sunlight.

In connection with step 105, the output of each receiver 20 is recorded when the beam 36 is off in order to collect a plurality of beam 36 off values. The off value of the receive signal 42 may normally be approximately zero. However, in the presence of sunlight, the off value of the receive signal 42 may be greater than zero.

In connection with step 106, an upper break band 52 is set to less than the lowest beam 36 on value. The upper break band 52 may be set to be lower than the weakest transmitter 18 output.

In connection with step 107, a lower break band 54 is set to greater than the largest beam 36 off value. The lower break band 54 may be set to be higher than the level of unwanted input from sunlight.

The above-described touchscreen display 12 provides numerous advantages over prior art touchscreen displays. For example, the touchscreen display 12 may reduce the occurrence of false touches caused by debris on the display screen 14 by recognizing that one or more beams 36 have been interrupted for a period of time that exceeds a threshold. The touchscreen display 12 may function properly in the presence of sunlight by compensating for the unwanted IR input to the receivers 20. The touchscreen display 12 may determine that a spill has occurred by recognizing that the number of beams 36 that are interrupted exceeds a threshold. The touchscreen display 12 may determine that frost is developing on the display screen 14 by recognizing that one or more beams 36 is partially blocked. The touchscreen display 12 may determine that a pinch or an unpinch is occurring on the display screen 14 by monitoring the size of a bounding box of beams 36 that are interrupted.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following.

What is claimed is:

1. Touchscreen electronics for detecting touches on a display screen, the touchscreen electronics comprising:
    a plurality of transmitters for transmitting beams across the display screen, each beam being switched on and off in a repeated pattern;
    a plurality of receivers configured to detect the beams from the transmitters, each receiver operable to generate an on value that corresponds to the beam being switched on and an off value that corresponds to the beam being switched off; and
    a controller in communication with the transmitters and the receivers and configured to:
        register an interrupted beam when the on value generated by one of the receivers transitions in a sequence from an on value greater than a lower level to a subsequent on value less than the lower level,
        register an uninterrupted beam when the on value generated by one of the receivers transitions in a sequence from an on value less than an upper level to a subsequent on value greater than the upper level, wherein the upper level is greater than the lower level, and
        determine that a touch event has occurred based on at least one of the registered interrupted beam and the registered uninterrupted beam.

2. The touchscreen electronics of claim 1, wherein the controller is further configured to determine that a touch has been initiated when the on value generated by one of the receivers transitions from an on value greater than the upper level to a subsequent on value less than the lower level.

3. The touchscreen electronics of claim 1, wherein the controller is further configured to determine that a touch has been terminated when the on value generated by one of the receivers transitions from an on value less than the lower level to a subsequent on value greater than the upper level.

4. The touchscreen electronics of claim 1, wherein the controller is further configured to determine a location on the display screen where the touch occurred by calculating an intersection of two or more beams that are interrupted.

5. The touchscreen electronics of claim 1, wherein the transmitters are positioned adjacent opposing edges of the display screen such that each transmitter is aligned with another transmitter across the display screen.

6. The touchscreen electronics of claim 1, wherein the upper level is less than a lowest value of the on values from all of the receivers when none of the beams is interrupted.

7. The touchscreen electronics of claim 1, wherein the lower level is greater than a largest value of the off values from all of the receivers when all of the beams are interrupted.

8. A touchscreen display comprising:
    a display screen on which information is displayed; and
    touchscreen electronics for detecting touches on the display screen, the touchscreen electronics comprising—
        a plurality of transmitters for transmitting beams across the display screen, each beam being switched on and off in a repeated pattern,
        a plurality of receivers configured to detect the beams from the transmitters, each receiver operable to generate an on value that corresponds to the beam being switched on and an off value that corresponds to the beam being switched off, and
        a controller in communication with the transmitters and the receivers and configured to:
            register an interrupted beam when the on value generated by one of the receivers transitions in a sequence from an on value greater than a lower level to a subsequent on value less than the lower level,
            register an uninterrupted beam when the on value generated by one of the receivers transitions in a sequence from an on value less than an upper level to a subsequent on value greater than the upper level, wherein the upper level is greater than the lower level, and
            determine that a touch event has occurred based on at least one of the registered interrupted beam and the registered uninterrupted beam.

9. The touchscreen display of claim 8, wherein the controller is further configured to determine that a touch has been initiated when the on value generated by one of the receivers transitions from an on value greater than the upper level to a subsequent on value less than the lower level.

10. The touchscreen display of claim 8, wherein the controller is further configured to determine that a touch has been terminated when the on value generated by one of the receivers transitions from an on value less than the lower level to a subsequent on value greater than the upper level.

11. The touchscreen display of claim 8, wherein the controller is further configured to determine the location on the display screen where the touch occurred by calculating an intersection of two or more beams that are interrupted.

12. The touchscreen display of claim 8, wherein the transmitters are positioned adjacent to opposing edges of the display screen such that each transmitter is aligned with another transmitter across the display screen.

13. The touchscreen display of claim 8, wherein the upper level is less than a lowest value of the on values from all of the receivers when none of the beams is interrupted.

14. The touchscreen display of claim 8, wherein the lower level is greater than a largest value of the off values from all of the receivers when all of the beams are interrupted.

15. An electronic device comprising:
a processing element for performing logical functions; and
a touchscreen display comprising—
  a display screen on which information is displayed, and
  touchscreen electronics for detecting touches on the display screen, the touchscreen electronics comprising—
    a plurality of transmitters positioned adjacent to opposing sides of the display screen for transmitting beams across the display screen, each beam being switched on and off in a repeated pattern,
    a plurality of receivers positioned adjacent to opposing sides of the display screen for detecting the beams from the transmitters, each receiver operable to generate an on value that corresponds to the beam being switched on and an off value that corresponds to the beam being switched off, and
    a controller in communication with the transmitters and the receivers and configured to:
      register an interrupted beam when the on value generated by one of the receivers transitions in a sequence from an on value greater than a lower level to a subsequent on value less than the lower level,
      register an uninterrupted beam when the on value generated by one of the receivers transitions in a sequence from an on value less than an upper level to a subsequent on value greater than the upper level, wherein the upper level is greater than the lower level, and
      determine that a touch event has occurred based on at least one of the registered interrupted beam and the registered uninterrupted beam.

16. The electronic device of claim 15, wherein the controller is further configured to determine the location on the display screen where the touch occurred by calculating the point where an interrupted beam transmitted from one side of the display screen intersects an interrupted beam transmitted from an orthogonal side of the display screen.

17. The electronic device of claim 15, wherein the controller is further configured to determine that a touch has been initiated when the on value generated by one of the receivers transitions from an on value greater than the upper level to a subsequent on value less than the lower level.

18. The electronic device of claim 15, wherein the controller is further configured to determine that a touch has been terminated when the on value generated by one of the receivers transitions from an on value less than the lower level to a subsequent on value greater than the upper level.

19. The electronic device of claim 15, wherein the upper level is less than a lowest value of the on values from all of the receivers when none of the beams is interrupted.

20. The electronic device of claim 15, wherein the lower level is greater than a largest value of the off values from all of the receivers when all of the beams are interrupted.

* * * * *